US012589266B2

(12) United States Patent
Xiong

(10) Patent No.: US 12,589,266 B2
(45) Date of Patent: Mar. 31, 2026

(54) ASBESTOS-REMOVAL PROTECTIVE WORK SUIT WITH VENTILATING/EXHAUSTING FAN MOUNTS

(71) Applicant: Saferun Safety Supplies Co., Ltd., Osaka (JP)

(72) Inventor: Bin Xiong, Osaka (JP)

(73) Assignee: Saferun Safety Supplies Co., Ltd., Osaka (JP)

( * ) Notice: Subject to any disclaimer, the term of this patent is extended or adjusted under 35 U.S.C. 154(b) by 0 days.

(21) Appl. No.: 19/010,132

(22) Filed: Jan. 5, 2025

(65) Prior Publication Data

US 2025/0332456 A1 Oct. 30, 2025

(30) Foreign Application Priority Data

Feb. 27, 2024 (JP) ................................ 2024-027036

(51) Int. Cl.

*A62B 17/00* (2006.01)
*A41D 27/28* (2006.01)

(Continued)

(52) U.S. Cl.

CPC ............ *A62B 17/006* (2013.01); *A41D 27/28* (2013.01); *A62B 7/10* (2013.01); *A62B 17/04* (2013.01); *A41D 2500/30* (2013.01)

(58) Field of Classification Search

CPC ......... A62B 17/006; A62B 17/04; A62B 7/10; A41D 27/28; A41D 13/0025

See application file for complete search history.

(56) References Cited

U.S. PATENT DOCUMENTS

2003/0192537 A1* 10/2003 Odell .................. A62B 17/006 128/201.25
2018/0295901 A1* 10/2018 Kittaka ................ F04D 29/646

(Continued)

FOREIGN PATENT DOCUMENTS

CN 112617321 A * 4/2021 ......... A41D 13/1107
CN 110621386 B * 1/2022 .......... B01D 46/521

(Continued)

OTHER PUBLICATIONS

Japan Ministry of Health, Labor and Welfare; Ministry of the Environment, “Total Manual of Measures for Preventing Asbestos Exposure and Preventing Asbestos Dispersal/ Leakage Involved in Dismantling etc. of Buildings and Other Architectural Structures,” Mar. 2021 (reflecting Mar. 2022 corrections), pp. 75, 252, 253, VI-3: <www. env. go. jp/content/900396898. pdf>.

*Primary Examiner* — Patrick J. Lynch
(74) *Attorney, Agent, or Firm* — j-pat U.S. patent Legal Services; James Judge

(57) ABSTRACT

Afforded is a ventilating/exhausting fan-mount equipped asbestos-removal protective work suit that reduces the risk of heat stroke yet does not create impediments to harsh asbestos removal projects. The protective suit is furnished with: air feed/exhaust sections provided on either side of a front trunk section of the suit, and ventilating/exhausting fan mounts, located on the inner side of the air feed/exhaust sections, for freely detachable/reattachable ventilating/exhausting fans, wherein the air feed/exhaust sections feature a filter component composed of a laminate intermediate of 150 to 250 $g/m^2$ grammage containing polyacrylonitrile fibers and polyolefin fibers, an outer layer, and an inner layer of 15 to 35 $g/m^2$ grammage containing polypropylene fibers. Except for the air feed/exhaust sections and the fan mounts, (Continued)

the main body of the protective suit is required to be composed of fabric material having a plastic film layer.

12 Claims, 13 Drawing Sheets

(51) Int. Cl.

| | |
|---|---|
| ***A62B 7/10*** | (2006.01) |
| ***A62B 17/04*** | (2006.01) |

(56) References Cited

U.S. PATENT DOCUMENTS

| | | | | |
|---|---|---|---|---|
| 2019/0239578 | A1* | 8/2019 | Ichigaya | F24F 1/04 |
| 2020/0297044 | A1* | 9/2020 | Xie | A41D 13/0025 |
| 2021/0137181 | A1* | 5/2021 | Patel | A41D 31/145 |
| 2022/0053843 | A1* | 2/2022 | Lo | A62B 18/006 |
| 2022/0218060 | A1* | 7/2022 | Yamauchi | A41D 13/0053 |

FOREIGN PATENT DOCUMENTS

| | | | | | |
|---|---|---|---|---|---|
| CN | 113577906 | B | * | 5/2023 | B01D 39/02 |
| JP | H07-256024 | A | | 10/1995 | |
| JP | 2000-189732 | A | | 7/2000 | |
| JP | 2002-249963 | A | | 9/2002 | |
| JP | 2005-016419 | A | | 1/2005 | |
| JP | 2017-150120 | A | | 8/2017 | |
| JP | 2022-8072 | A | | 1/2022 | |
| JP | 2022-54779 | A | | 4/2022 | |
| JP | 2023-28830 | A | | 3/2023 | |
| KR | 102185694 | B1 | * | 12/2020 | B01D 39/1623 |
| WO | WO-2007061088 | A1 | * | 5/2007 | A41D 13/0025 |
| WO | WO 2016-063416 | A1 | | 4/2016 | |
| WO | WO 2018/025784 | | | 2/2018 | |

* cited by examiner

ASBESTOS-REMOVAL PROTECTIVE WORK SUIT WITH VENTILATING/EXHAUSTING FAN MOUNTS

BACKGROUND

Technical Field

The present invention relates to an asbestos-removal protective suit with ventilating/exhausting fan mounts.

Asbestos came to be used widely in the latter half of the $20^{th}$ century in building and other materials including friction materials. However, for laborers and for people in general who inhaled it, asbestos would after a long latency period give rise to grave health disorders like lung cancer and mesotheliomas. As a consequence, at present almost all developed countries have banned the use of asbestos.

Nevertheless, given that the dismantling of existing asbestos-containing buildings will proceed until around the middle of the $21^{st}$ century, preventive countermeasures for purposes such as laborers' exposure during operations on asbestos-containing structures, and asbestos leakage/dispersal into the environment have become issues of major concern.

For reasons stated above, in Japan, the Ministry of Health, Labor and Welfare, in addition to the Ministry of the Environment, in having drafted the "Total Manual of Measures for Preventing Asbestos Exposure and Preventing Asbestos Dispersal/Leakage Involved in Dismantling Etc. of Buildings and Other Architectural Structures," set forth guidelines relating to asbestos removal work.

PRECEDENT TECHNICAL LITERATURE

Non-Patent Document 1

Ministry of Health, Labor and Welfare; Ministry of the Environment: *Total Manual of Measures for Preventing Asbestos Exposure and Preventing Asbestos Dispersal/ Leakage Involved in Dismantling Etc. of Buildings and Other Architectural Structures*, March 2021 (reflecting March 2022 corrections).

SUMMARY OF INVENTION

Issues Invention is to Address

Nevertheless, as stated in Non-Patent Document 1, from the perspective of preventing adherence of asbestos to body surfaces, underwear, and work clothes worn beneath protective suits, it is provided that during the job a product that is at least equivalent to a JIS T 8115 airtight suit (Type 5) for protecting against airborne solid particulates be employed. This sort of protective suit must cover the entire body including the head; therein, owing to the fact that the seams between the protective suit and the full-face mask, gloves, shoe-covers and other respiratory protective gear require taping, the level of airtightness is extremely high. On top of wearing such protective suits, performing extraordinarily diverse and complex tasks over long periods of time places a serious burden on workers.

Furthermore, in these sorts of conditions, if the job is under the intense heat of summer, the risk of heat stroke becomes extremely high. What is more, with workers' focus scattering owing to the heat, there is a likelihood that intolerable on-the-job errors will occur.

In instances described above, while employing garment-attachable ventilating fans, lately being used at construction sites and the like, is conceivable, it would require preventing the asbestos from being taken into the protective garment interior. Even if taking in only clean outside air was feasible, there is a likelihood that the resultingly inflated, bulky suit would become a hindrance to the work, especially considering the fact that asbestos removal work is done indoors, often in confined spaces.

An objective of the present invention, brought about to resolve the issues discussed above, is to alleviate the danger of heat stroke yet not impose impediments to the job, even in harsh asbestos removal work.

Means for Resolving Issues

An asbestos-removal protective work suit with ventilating/exhausting fan mounts that embodies one possible configuration of the present invention comprises air feed/exhaust filters furnished on either side of the front torso section of the suit, and mounts for ventilating/exhausting fans, furnished on the inner side of the air feed/exhaust filters, for detachably mounting ventilating/exhausting fans. The air feed/exhaust filters comprise a laminate intermediate of 150 to 250 $g/m^2$ grammage containing polyacrylonitrile fibers and polyolefin fibers, between an outer layer and an inner layer of 15 to 35 $g/m^2$ grammage containing polypropylene fibers. The fabric material of the body, apart from the air feed/exhaust filters and the ventilating/exhausting fan mounts, has a plastic film outer layer.

According to the present configuration, by means of ventilating/exhausting fans, during ventilation, external air can be taken in through the air feed/exhaust filters, and during exhaustion, air warmed and dampened by the body temperature and moisture inside the protective suit can be exhausted through the air feed/exhaust filters. This maintains a low temperature and humidity inside the protective suit, wherein the danger of heatstroke in the worker can be alleviated.

An asbestos-removal protective work suit with ventilating/exhausting fan mounts involving a separate possible configuration of the present invention comprises air feed/ exhaust filters furnished on either side of the back torso section of the suit, and mounts for ventilating/exhausting fans, furnished on the inner side of the air feed/exhaust filters, for detachable mounting ventilating/exhausting fans. The air feed/exhaust filters comprise a laminate intermediate of 150 to 250 $g/m^2$ grammage containing polyacrylonitrile fibers and polyolefin fibers, between an outer layer and an inner layer of 15 to 35 $g/m^2$ grammage containing polypropylene fibers. The fabric material of the body, apart from the air feed/exhaust filters and the ventilating/exhausting fan mounts, has a plastic film outer layer.

An asbestos-removal protective work suit with ventilating/exhausting fan mounts involving the above-stated one possible configuration may comprise an air exit/entry filter in the back torso section, provided that it is above the air feed/exhaust filters.

According to the present configuration, air can be introduced into and exhausted through the air exit/entry filter in addition to the air feed/exhaust filter, enabling more efficient feeding and exhausting of air to take place throughout the protective suit.

An asbestos-removal protective work suit with ventilating/exhausting fan mounts involving the above-stated separate possible configuration may comprise an air exit/entry filter in the front torso section, provided that it is above the air feed/exhaust filter.

In each of the above-stated asbestos-removal protective work suit with ventilating/exhausting fan mounts configurations, the laminate intermediate, the outer-side layer, and the inner-side layer may be bonded together by means of ultrasonic welding.

According to the present configurations, the possibility of asbestos fibers being taken into the protective suit interior during ventilation is extremely low; outer air can be efficiently introduced into the protective-suit interior, and during exhaustion, the discharging of air is not hindered.

In each of the above-stated asbestos-removal protective work suit with ventilating/exhausting fan mounts configurations, the air exit/entry filter may be a spunbond-meltblown-spunbond (spun-melt-spun, SMS) nonwoven fabric, or it may be the same material as the above-stated air feed/exhaust filter.

The present configurations feature favorable air feed and exhaust characteristics; moreover, the possibility that asbestos fibers might be taken in through the air exit/entry section can be made extraordinarily low.

In each of the above-described configurations of an asbestos-removal protective work suit with ventilating/exhausting fan mounts, the fan mounts may include a synthetic resin slot with an opening for mounting a fan, and an outer frame to which the synthetic resin slot is attached. The slot may be created from a single piece of material, with notches cut into the inner side of the top two corners, creating a U-shaped slot and a top flap which secures the fan in place.

This configuration allows installation of the ventilating/exhausting fans to be completed simply and quickly; moreover, the configuration makes stabilized attachment of the ventilating/exhausting fans possible.

Each of the above-stated configurations may be used with or without a detachable ventilating fan, in accordance with conditions of the operating environment.

The configurations of the protective suit with fans described above may alternate between ventilating, exhausting, and the alternation of the two settings, by means of an attached control device.

The protective suit described above keeps the air inside the suit dry and cool, reducing the worker's awareness of an inherently bothersome suit, and allows the worker to properly concentrate on performing tasks in comfort.

Advantageous Effects of Invention

The protective suits described above reduce risk of heat stroke in harsh asbestos removal projects while avoiding imposing impediments on tasks or increasing the chance of error.

MODES FOR EMBODYING INVENTION

Figure 1A:
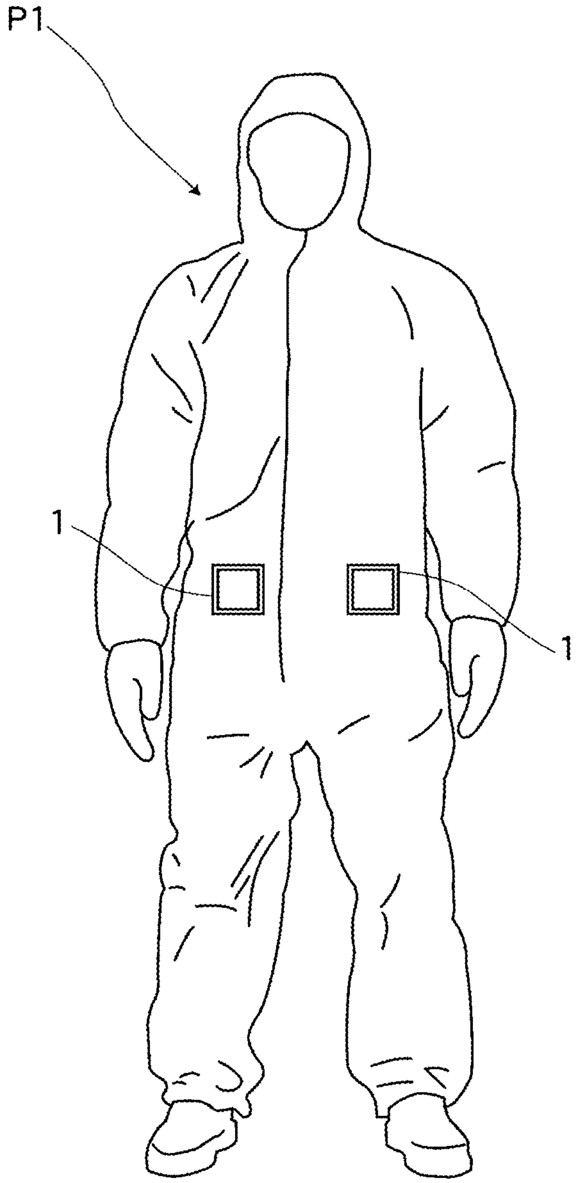
FIG. 1A is a front-side view, and FIG. 1B a back-side view, of the asbestos-removal protective work suit with ventilating/exhausting fan mounts involving a first embodying mode of the present invention.

Referring to the drawings, an explanation of modes of embodying the present invention will be made hereinafter.

Figure 1B:
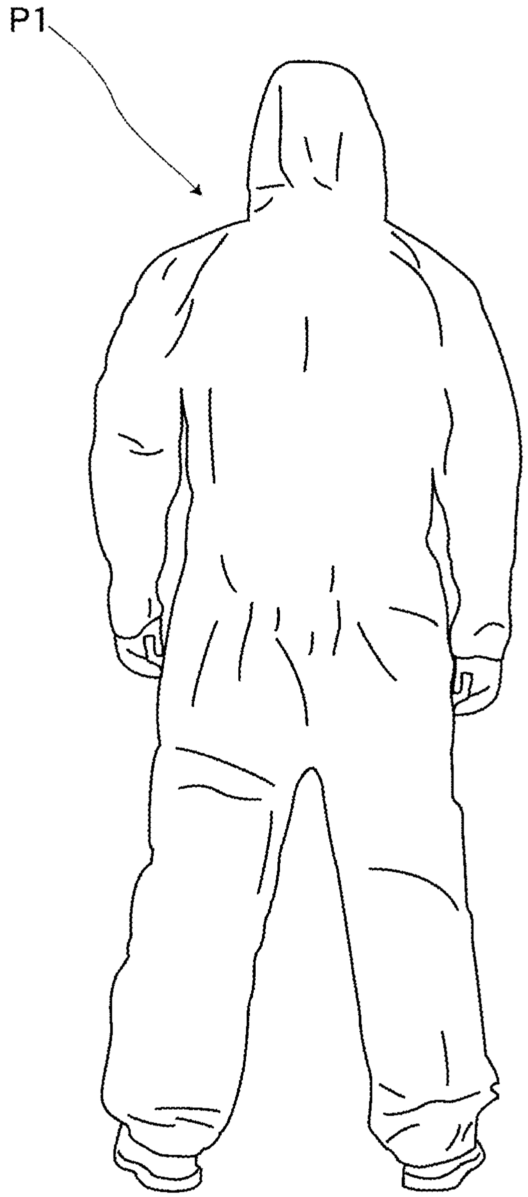

FIG. 1A is a front-side view, and FIG. 1B a back-side view, of an asbestos-removal protective work suit with ventilating/exhausting fan mounts involving a first configuration of the present invention. As depicted in FIG. 1A, a ventilating/exhausting fan-mount equipped asbestos-removal protective work suit P1 is provided with air feed/exhaust sections 1 on either of left/right sides of a front-side trunk section.

The ventilating/exhausting fan-mount equipped asbestos-removal protective work suit P1 meets the requirements of a JIS T 8115 airtight suit (Type 5) for protecting against airborne solid particulates in asbestos-removal work locations including negative-pressure isolation interiors, as described on page 253 of the "Total Manual of Measures for Preventing Asbestos Exposure and Preventing Asbestos Dispersal/Leakage Involved in Dismantling Etc. of Buildings and Other Architectural Structures," March 2021 (reflecting March 2022 corrections). The asbestos-removal protective work suits P2, P3, and P4, described below, are likewise.

The material of the ventilating/exhausting fan-mount equipped asbestos-removal protective work suit P1, while not particularly limited as long as the JIS T 8115 requirements for an airtight suit (Type 5) for protecting against airborne solid particulates are met, can be designed as a structure of one or more layers, selected from the group consisting of plastic film layers, SMS nonwoven fabric layers, and spun-bond polypropylene layers. Among these, it is preferable that the material be a bilaminar structure of a plastic film layer and an SMS nonwoven fabric layer, to prevent to the extent possible the passing through of asbestos fibers. Such suitable materials can be used in the protective work suit P1 in all parts except the air feed/exhaust sections 1.

As for the material of the plastic film layer, examples include polyethylene, polyvinyl chloride, polyethylene terephthalate, polyacrylonitrile, ethylene vinyl alcohol copolymer, and polyvinyl alcohol. Among these, from the perspective of cost control, regular polyethylene is preferable, while from the perspective of asbestos fiber filtration, a high-density polyethylene (HDPE) is more desirable.

As for the material of the SMS nonwoven fabric layer, a trilaminar structure that is a polypropylene spun-bond layer, a polypropylene melt-blown layer, and a polypropylene spun-bond layer may be cited as an example.

The air feed/exhaust parts 1 are for passing air between the exterior and the interior of the protective suit P1. During ventilation, the detachable fans introduce exterior air through the air feed/exhaust parts during ventilation. The worker's body temperature and perspiration warms and dampens the air inside, which is then discharged by the fans during exhaustion. The ventilating fans are ordinarily placed on the front of the torso, but may be installed on the lateral sides or back side of the torso without impacting effectiveness.

Figure 2A:
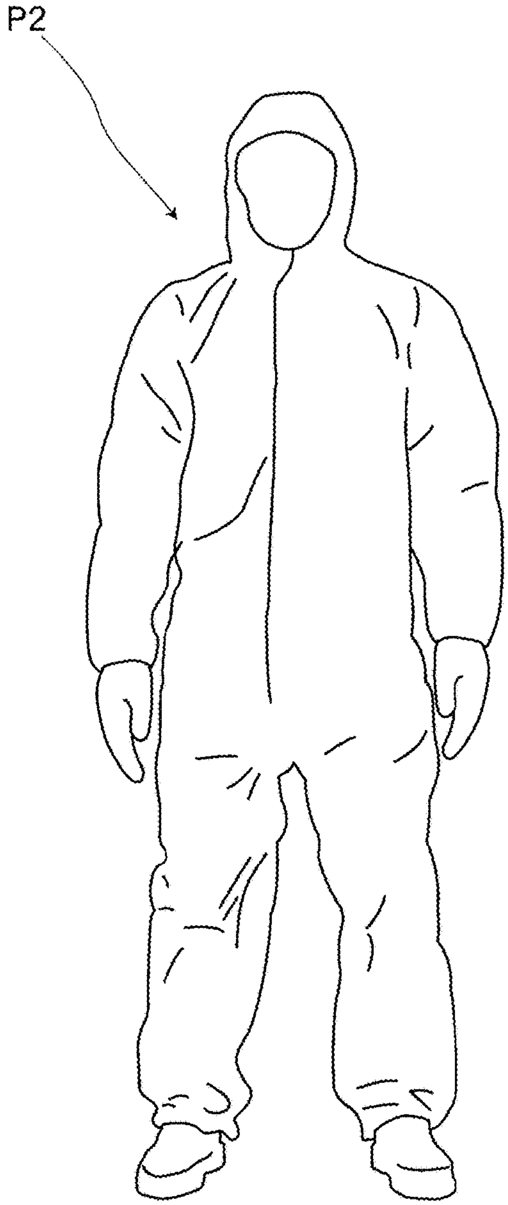
FIG. 2A is a front-side view, and FIG. 2B a back-side view, of an asbestos-removal protective work suit with ventilating/exhausting fan mounts involving a second embodying mode of the present invention.
Figure 2B:
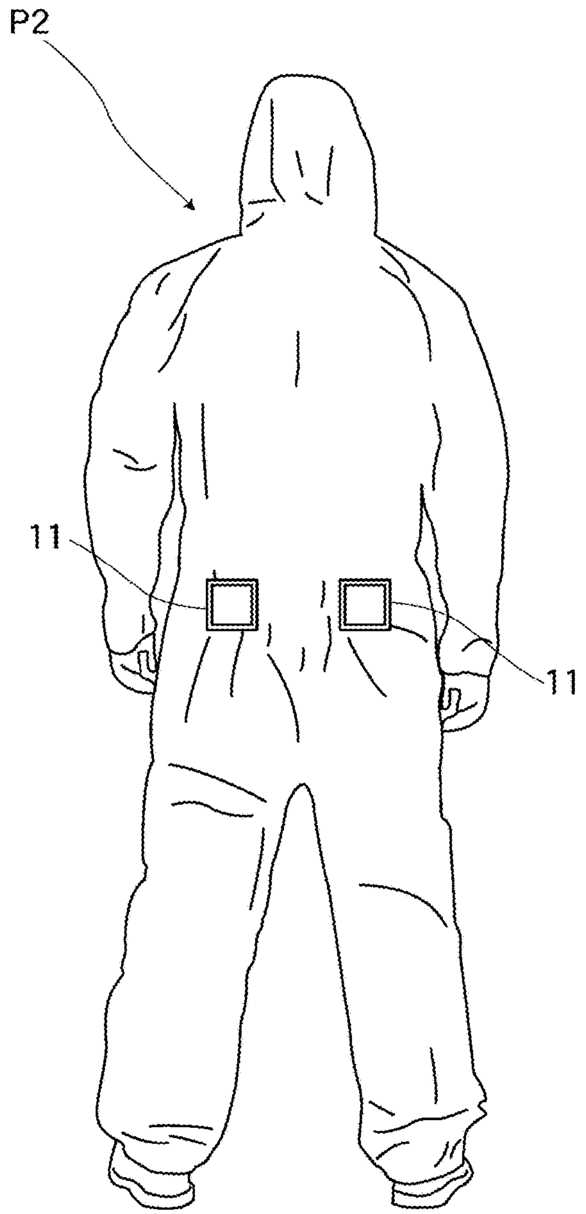

FIG. 2A is a front-side view, and FIG. 2B a back-side view, of the protective suit involving a second configuration of the present invention. As depicted in FIG. 2B, the protective suit P2 is furnished with air feed/exhaust parts 11 on either side of the back of the torso.

The material of the protective suit P2 is the same as that of its foregoing counterpart (protective suit P1), and the air feed/exhaust parts 11 are the same as the air feed/exhaust parts 1.

Figure 3:
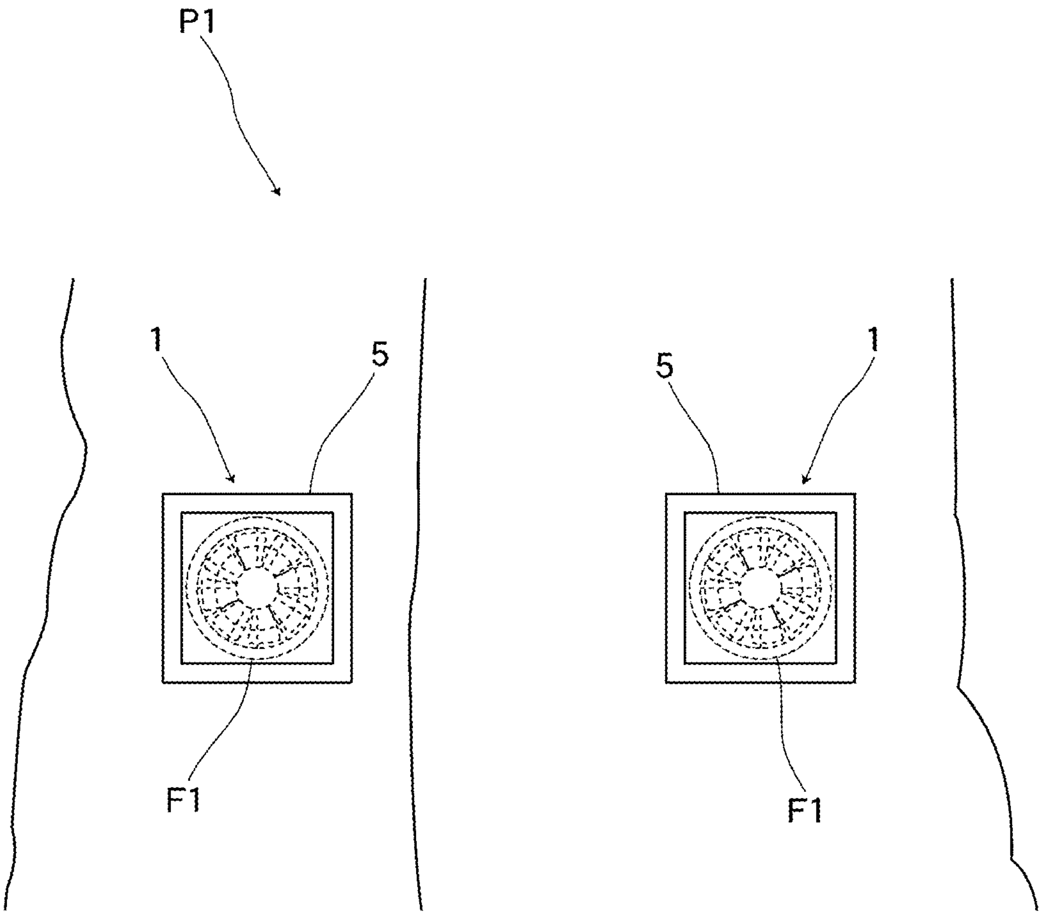
FIG. 3 is a front-side enlarged view in which air feed/exhaust sections of the asbestos-removal protective work suit with ventilating/exhausting fan mounts involving a first embodying mode of the present invention have been enlarged.

FIG. 3 is a front-side enlarged view of the air feed/exhaust parts of the protective suit P1. As indicated in FIG. 3, the air feed/exhaust parts 1 are composed of hermetically sealed filter components 5 openings provided in the protective suit P1. In the air feed/exhaust parts 1 along the inner side of the protective suit P1, detachable fans F1 are installed in the fan mounts, wherein by the fans F1 being in operation, via the filter component 5, air is introduced into the protective suit P1 interior, after which air is discharged to the exterior.

Figure 4A:
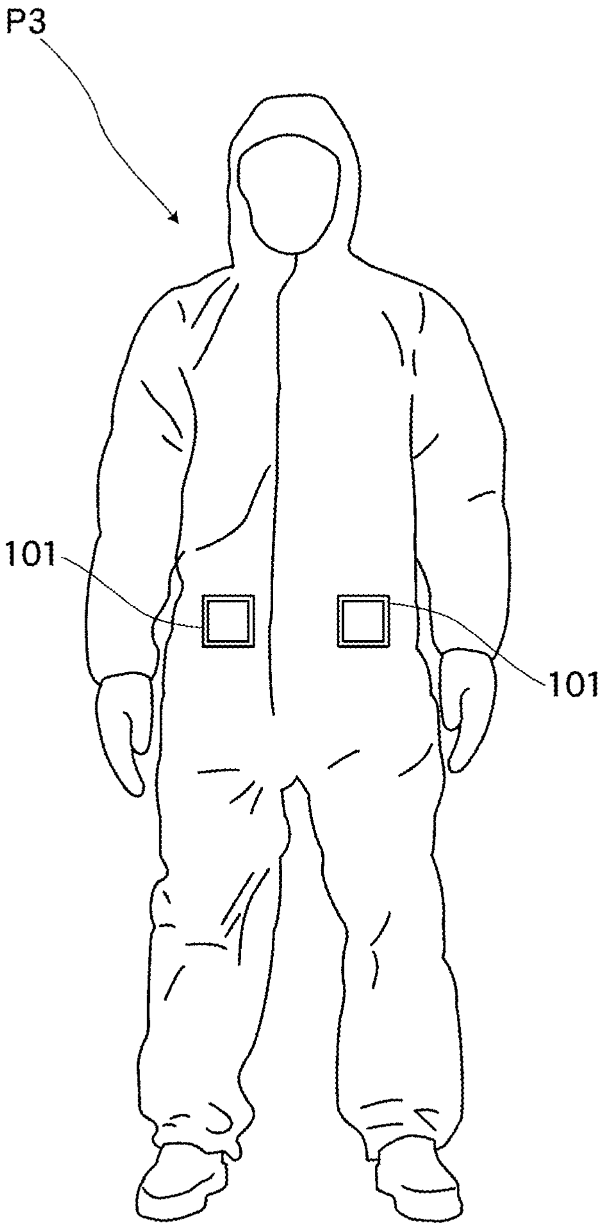
FIG. 4A is a front-side view, and FIG. 4B a back-side view, of an asbestos-removal protective work suit with ventilating/exhausting fan mounts involving a third embodying mode of the present invention.
Figure 4B:
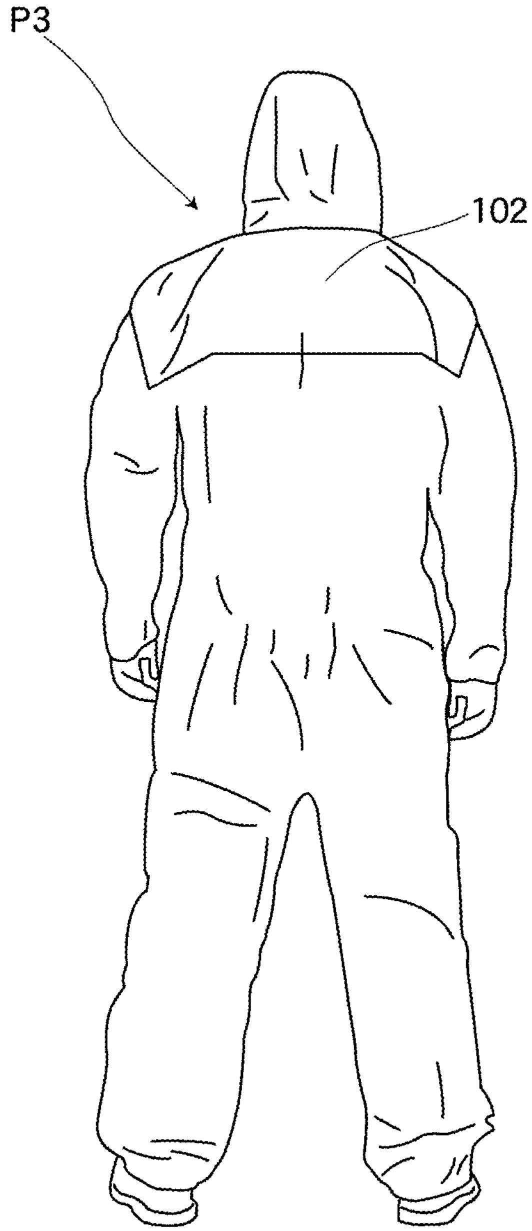

FIG. 4A is a front-side view, and FIG. 4B a back-side view, of the protective suit with fan mounts involving a third configuration of the present invention. As depicted in FIG. 4A, a protective suit P3 is provided with air feed/exhaust sections 101 on either of left/right sides of the front-side trunk section. As indicated in FIG. 4B, the protective suit P3 is furnished with an air exit/entry section 102 on the back-side trunk section above the air feed/exhaust sections 101.

The air exit/entry section 102 is for discharging air from inside when the fans F1 are ventilating the protective suit P3, and for introducing external air in when they are exhausting the protective suit P3. The air exit/entry section 102, from the perspective of effectively discharging internal air that has been warmed by body temperature, is provided upward from the air feed/exhaust sections 101 and on the side opposite from the air feed/exhaust sections 101. An SMS nonwoven fabric, or the same filter as that of the air feed/exhaust parts 101 may be cited as the material of the air exit/entry section 102. The surface area of the air exit/entry section 102 is preferably greater than that of the air feed/exhaust sections 101.

The material of the protective suit P3 is the same as that of the protective suit P1, and the air feed/exhaust parts 101 are the same as the air feed/exhaust parts 1.

Figure 5A:
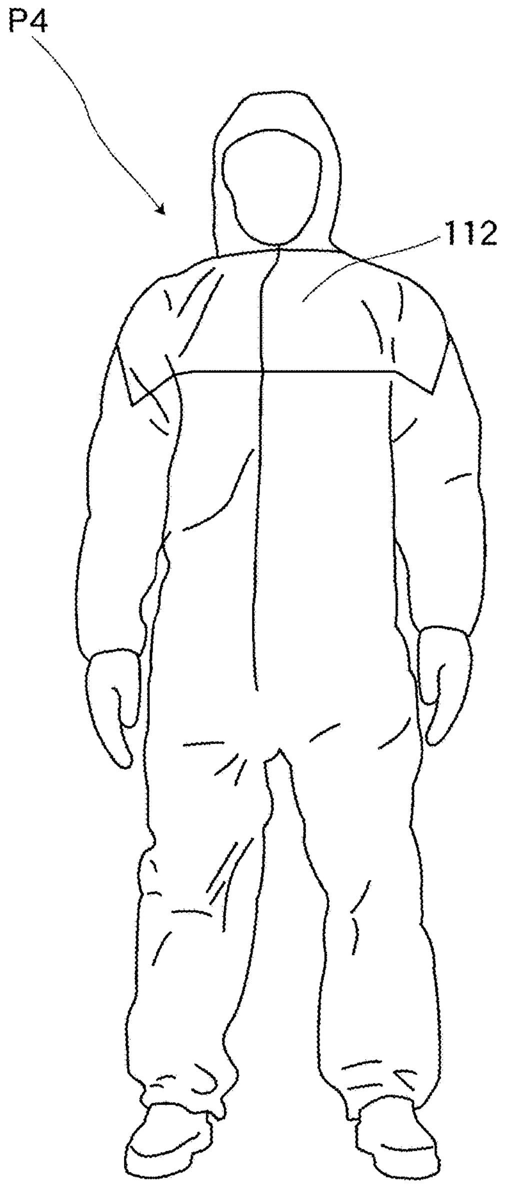
FIG. 5A is a front-side view, and FIG. 5B a back-side view, of an asbestos-removal protective work suit with ventilating/exhausting fan mounts involving a fourth embodying mode of the present invention.
Figure 5B:
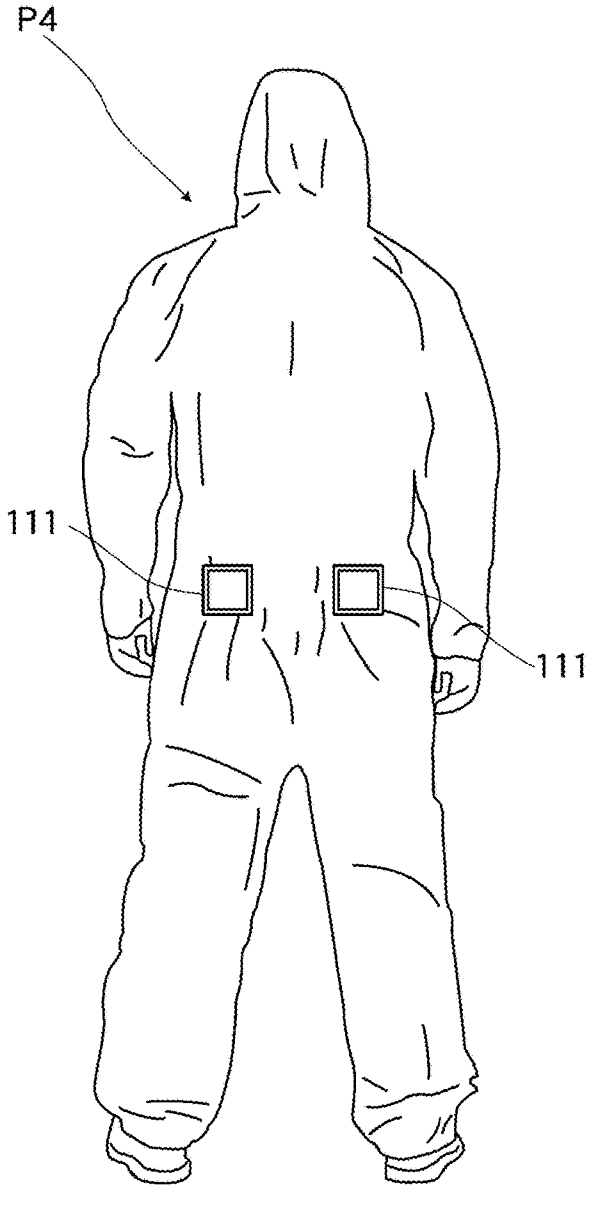

FIG. 5A is a front-side view, and FIG. 5B a back-side view, of the protective suit involving a fourth configuration of the present invention. As illustrated in FIG. 5B, a protective suit P4 is furnished with air feed/exhaust parts 111 on either sides of the back-side trunk section. As indicated in FIG. 5A, the protective suit P4 is furnished with an air exit/entry part 112 on the front-side trunk section above the air feed/exhaust parts 111.

The material of the protective suit P4 is the same as that of the protective suit P1, and, respectively, the air feed/exhaust parts 111 are the same as the air feed/exhaust parts 1. Such is the case with air exit/entry part 112 and the air exit/entry part 102.

Figure 6A:
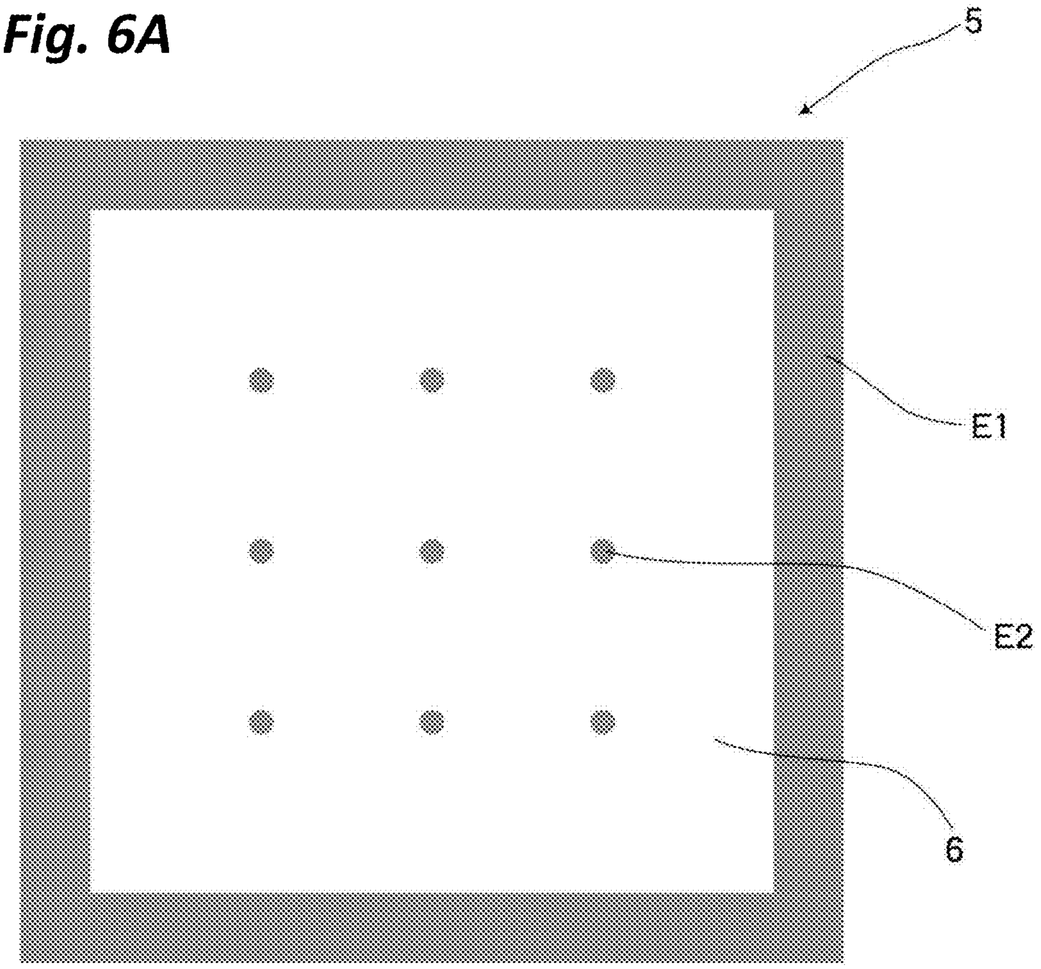
FIG. 6A is a schematized front-side diagram representing ultrasonic weld areas, and FIG. 6B a schematized cross-section diagram, relating to a single example of a filter component utilized in an asbestos-removal protective work suit with ventilating/exhausting fan mounts involving the first embodying mode of the present invention.
Figure 6B:
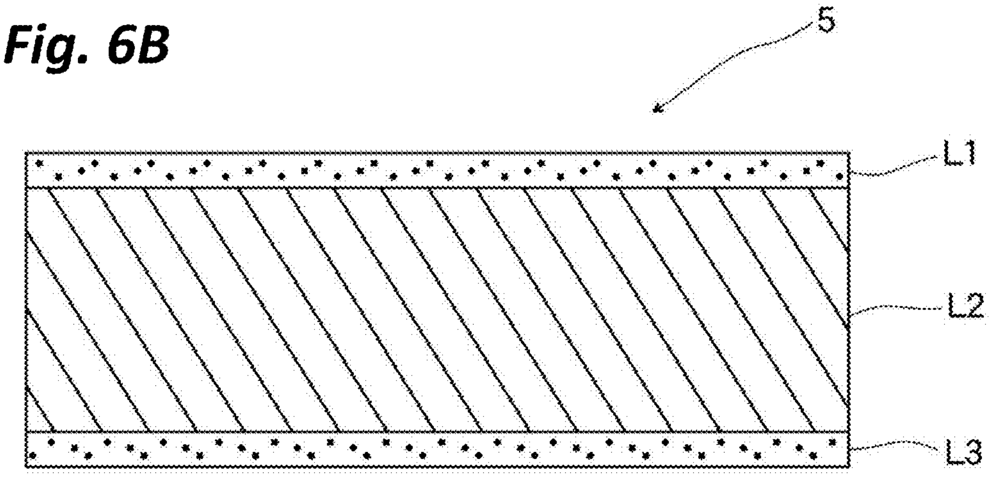

FIG. 6A is a schematized front-side diagram representing ultrasonic weld areas, and FIG. 6B a schematized cross-section diagram, relating to a single example of a filter component utilized in protective suit with involving the first configuration of the present invention. The filter component 5 should be constructed in such a way that asbestos fibers do not intrude inside the protective suit P1. As indicated in FIG. 6B, the filter component 5 has a laminate intermediate L2, which contains polyacrylonitrile fibers and polyolefin fibers, and an outer layer L1 and an inner layer L3, which contain polypropylene fibers.

In terms of grammage, the laminate intermediate L2 is 150 to 250 g/m$^2$, preferably 160 to 240 g/m$^2$. Likewise, the grammage for the outer-side layer L1 and grammage for the inner-side layer L3 is 15 to 35 g/m$^2$, preferably 20 to 30 g/m$^2$.

The laminate intermediate L2 can be manufactured by a publicly known method—for example, the methods set forth in Japanese Unexamined Pat. App. Pub. Nos. H7-256024, 2000-189732, and 2002-249963, among others. The polyolefin fibers may be but are not limited to polyethylene or polypropylene. Between these, polypropylene is preferable due to its breathability and effectiveness at filtering asbestos fibers.

The outer-side layer L1 and the inner-side layer L3 can be manufactured by a publicly known method. For example, in a way similar to mass produced masks employing nonwoven fabrics containing polypropylene, articles rendered with a nonwoven fabric containing polypropylene fibers can be utilized.

The filter component 5 can be manufactured by methods including but not limited to spunbond and ultrasonic welding. Between these, in this instance, it is preferable to manufacture the filter component by ultrasonic welding. The layers L1, L2 and L3 are laminated and as indicated in FIG. 6A, an outer-frame weld section E1 and multiple in-frame weld spots E2 are ultrasonically welded together to produce the filter component 5.

The filter component 5 in the protective suit P1 is attached in a form in which it completely seals the opening. As for methods of its attachment, examples include but are not limited to double-sided tape and sewing. Making the size of the opening slightly smaller than that of the filter component 5 is preferable; having it be of like size as the ventilation section 6 is more preferable still.

Figure 7:
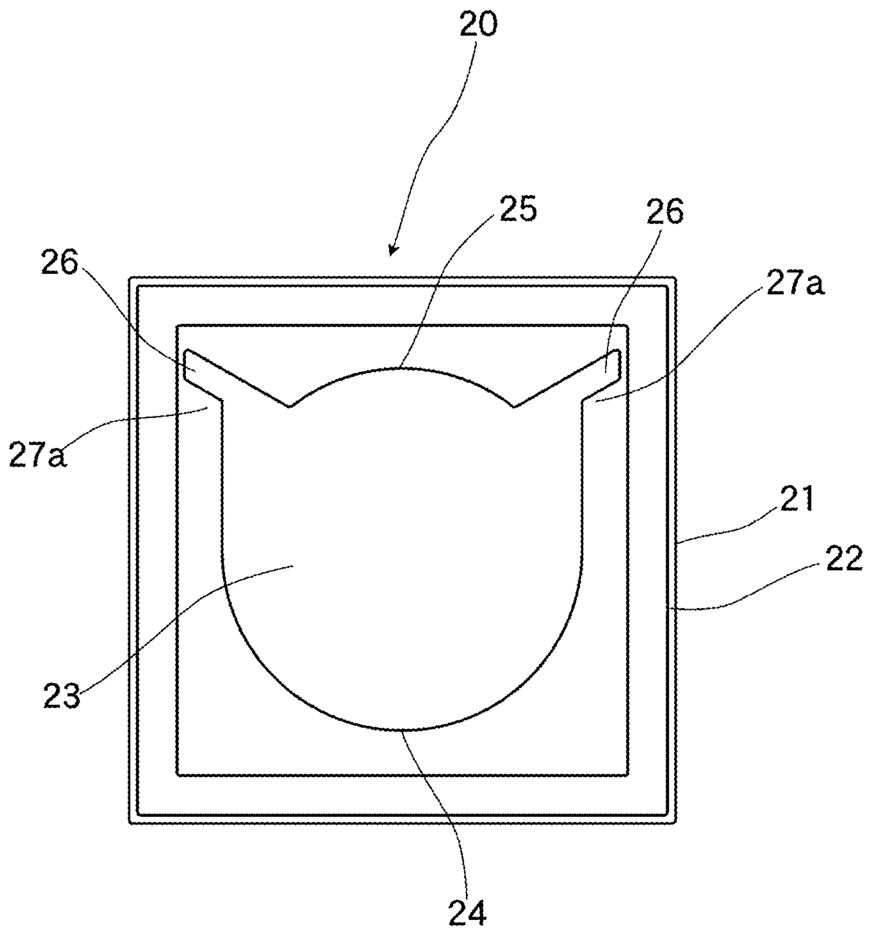
FIG. 7 is a schematized diagram that represents a single example of a ventilating/exhausting fan mount utilized in an asbestos-removal protective work suit with ventilating/exhausting fan mounts of the present invention.

FIG. 7 is a schematized diagram that represents a single example of the protective suit of the present invention. As indicated in FIG. 7, the fan mount 20 is furnished with an outer frame 21 and a synthetic resin component 22. The fan mount 20 is of about the same size as the filter component 5, and is attached and anchored to the inner side of the protective suit P1. The synthetic resin component 22 is mounted in the outer frame 21 and may either be the same size or slightly smaller than it; and when the synthetic resin component 22 has been anchored to the protective suit P1, it is to be positioned to the protective suit P1 inner side of the outer frame 21.

While the method whereby the outer frame 21 is anchored to the protective suit P1 is not particularly limited, it could be adhered, for example, by double-sided tape or similar means.

As for the material of the synthetic resin component 22, examples that may be given include plastics and rubbers. As an example of plastics, thermoplastic resins may be cited, including polyethylene, polypropylene, and polyethylene terephthalate. The synthetic resin component 22 comprises an opening 23, a first interlocking section 24, a second interlocking section 25, notches 26, and protrusions 27*a*.

Figure 8A:
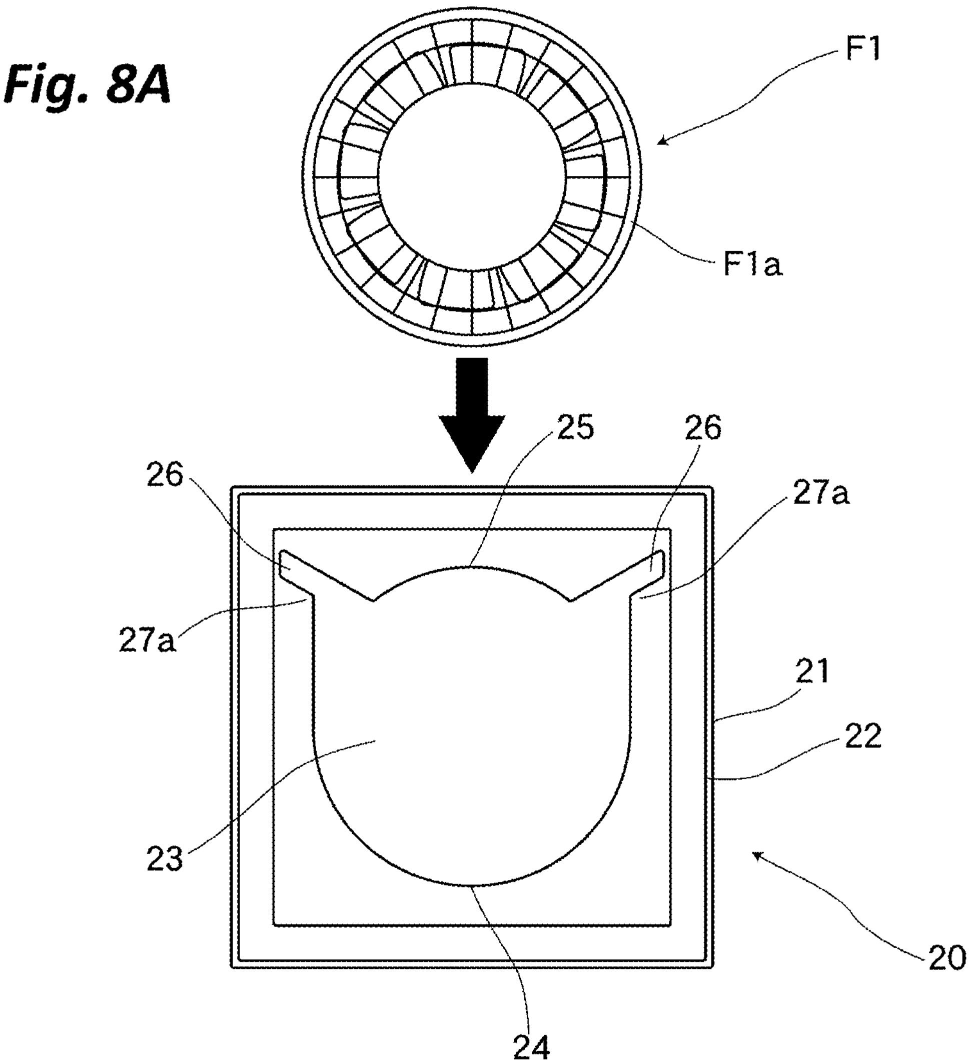
FIG. 8A is a schematized diagram that indicates flow for mounting a ventilating/exhausting fan.
Figure 8B:
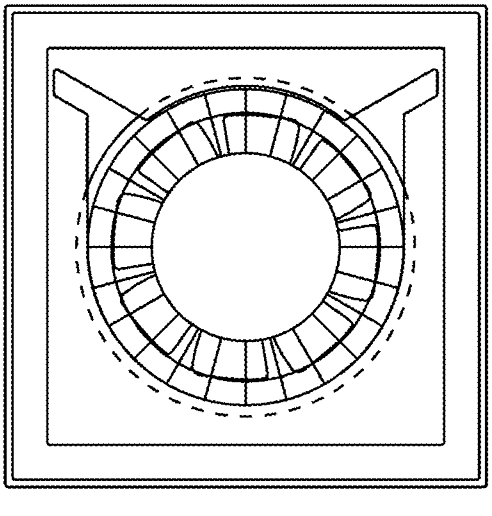
FIG. 8B is a schematized diagram that depicts a ventilating/exhausting fan having been mounted, onto the single example of a ventilating/exhausting fan mount utilized in an asbestos-removal protective work suit with ventilating/exhausting fan mounts of the present invention.

FIG. 8A is a schematized diagram that indicates flow for mounting a fan, and FIG. 8B is a schematized diagram that depicts a fan having been mounted, onto the single example of a fan mount utilized in a protective suit with of the present invention. A flow according to which a fan F1 is mounted into the fan mount 20 will be described in the following. It should be noted that the fan F1 can be, for example, a commercially available work-suit ventilating fan that is employed having been converted into a ventilating/exhausting fan.

To begin with, a flange F1*a* on the fan F1 is made to pass through the notches 26 and is inserted until it interlocks with the first interlocking section 24. After that, the second interlocking section 25 is bent toward the inner side of the protective suit P1 and interlocked with the upper part of the flange F1*a* as indicated in FIG. 8B, anchoring the fan F1 to the fan mount 20.

Figure 9:
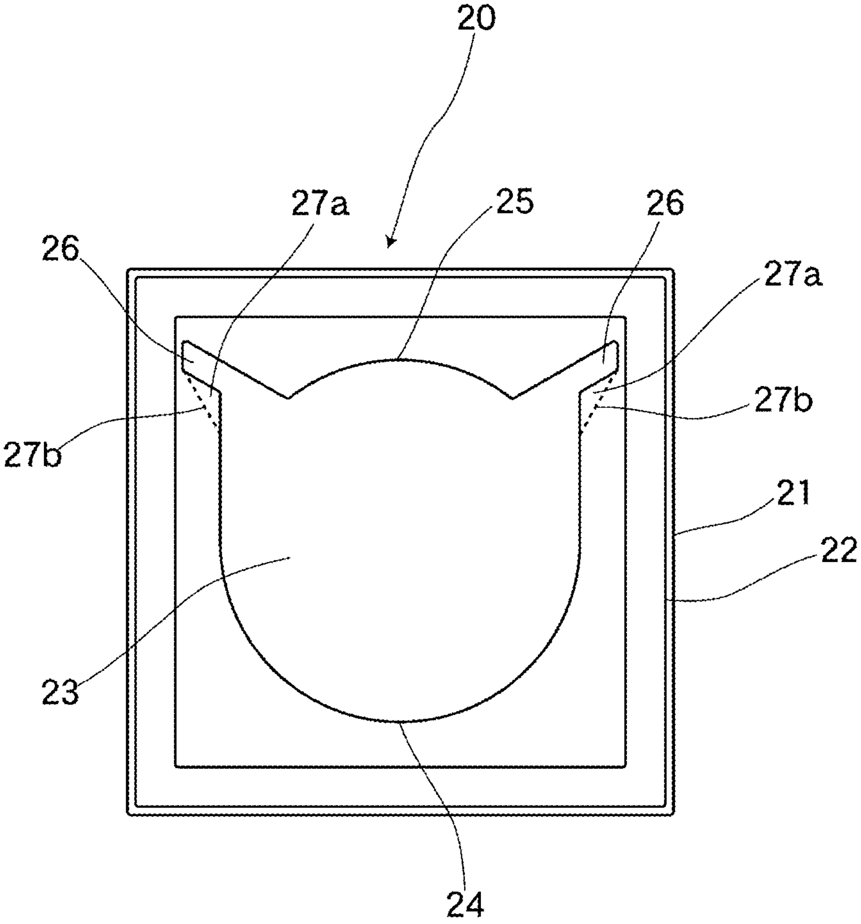
FIG. 9 is a schematized diagram that represents another single example of a ventilating/exhausting fan mount utilized in an asbestos-removal protective work suit with ventilating/exhausting fan mounts of the present invention.

FIG. 9 is a schematized diagram that represents another example of a fan mount utilized in a protective suit of the present invention. As represented in FIG. 9, the synthetic resin component 22 is provided with bend lines 27*b*, with the protrusions 27*a* being twistable about the bend lines 27*b* as axes. Depending on the material of the synthetic resin component 22, providing the bend lines 27*b* may enable smoother attachment of the fan F1.

Figure 10A:
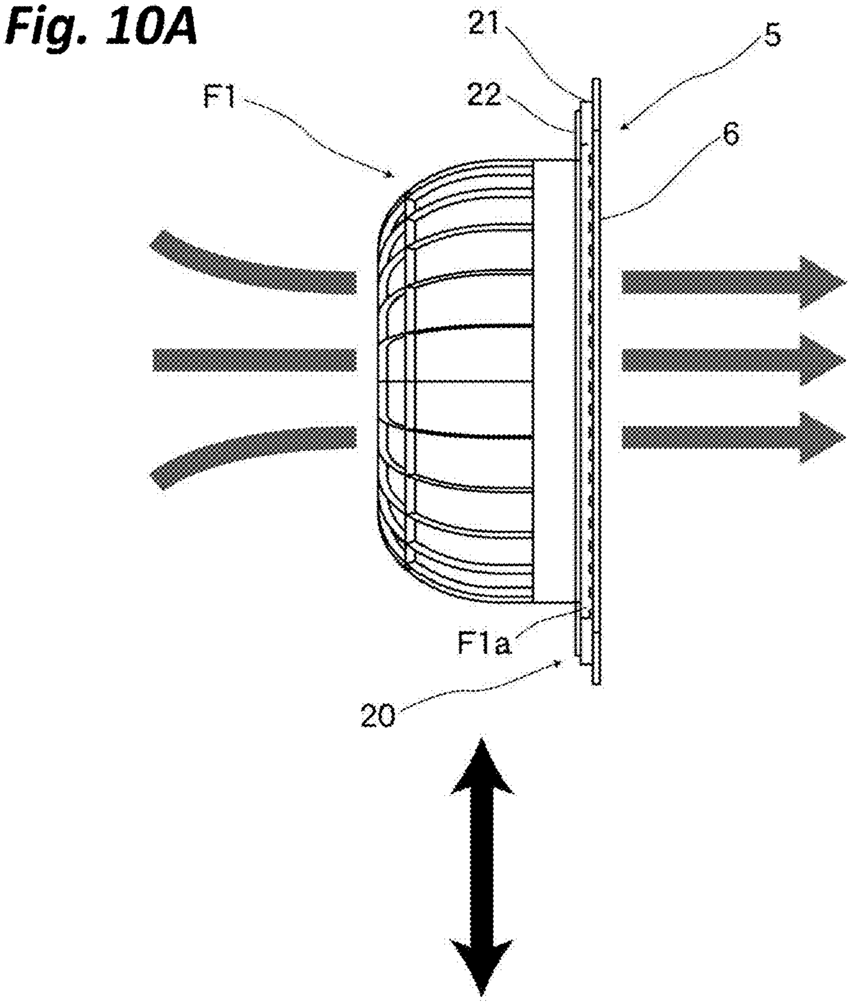
FIG. 10A is a schematized lateral-side diagram representing an exhausting state.
Figure 10B:
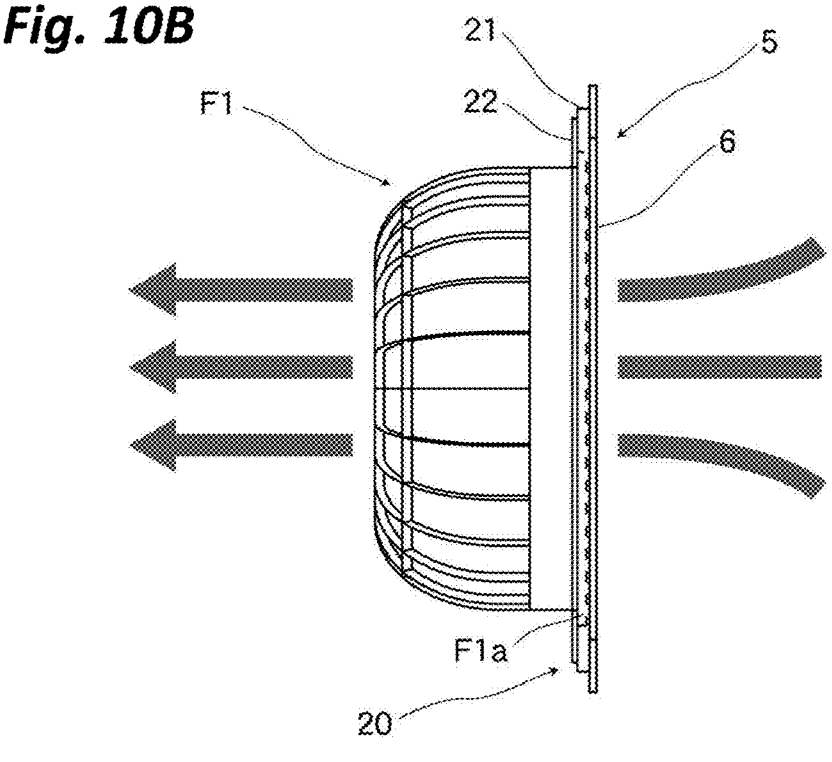
FIG. 10B is a schematized lateral-side diagram representing a ventilating state, of when a ventilating/exhausting fan has been mounted onto the single example of a ventilating/exhausting fan mount utilized in an asbestos-removal protective work suit with ventilating/exhausting fan mounts of the present invention, and is operating.

FIG. 10A is a schematized lateral-side diagram representing an exhausting state, and FIG. 10B is a schematized lateral-side diagram representing a ventilating state, of when an operating fan has been mounted onto the single example of the protective suit of the present invention. During exhaustion, as indicated in FIG. 10A, fan F1 is in exhausting mode, in which dampened air in the protective suit P1 interior is discharged. By the same token, as indicated in FIG. 10B, when fan F1 is in ventilating mode, external air is introduced into the protective suit P1 interior. As indicated with the double-headed arrow in FIGS. 10A and 10B, this example may be configured in such a way that fan F1 alternates automatically between exhausting and ventilating modes.

The protective suit P1 has, although not depicted in FIG. 10, filter components 5 mounted on the outer side of the protective suit P1, and fan mounts 20 provided on the inner side of the protective suit P1. Fans F1 are installed further on inner side in such a way as to make the flanges F1*a* interlock with the synthetic resin components 22. Having the configuration be this way allows detachable fans to be attached/detached any number of times to/from the asbestos-removal protective suits, which must be disposed of every time a job is finished, and enables the asbestos-removal protective work suit to be put on swiftly.

Figure 11:
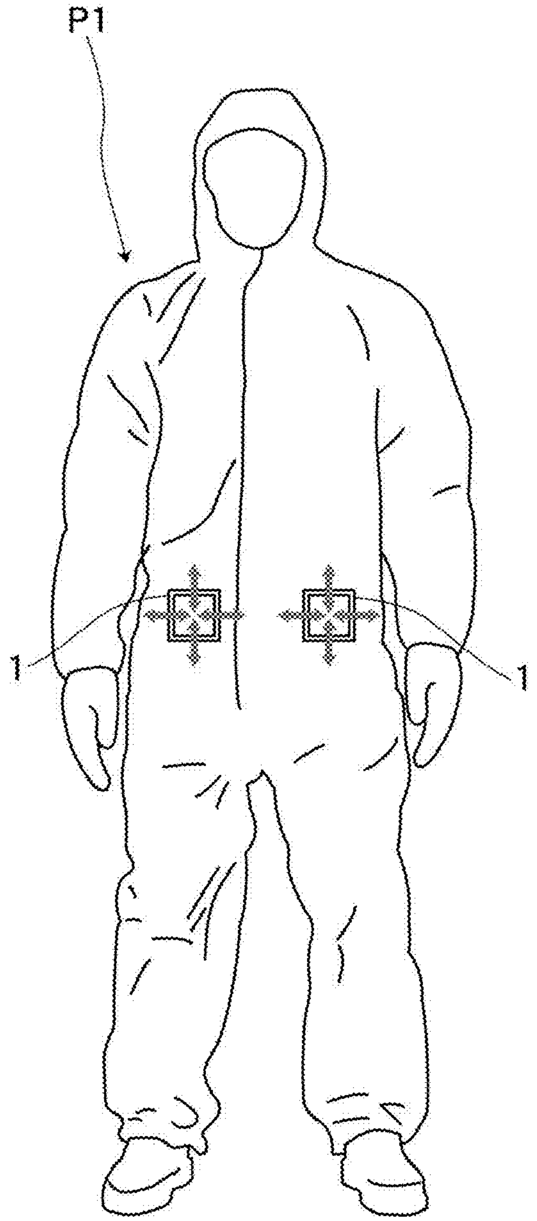
FIG. 11 is a schematized front-side diagram representing flows of air when ventilating/exhausting fans have been installed and are being operated in the asbestos-removal protective work suit with ventilating/exhausting fan mounts involving a first embodying mode of the present invention.

FIG. 11 is a schematized front-side diagram representing flows of air when ventilating/exhausting fans have been installed and are being operated in the protective suit involving the first embodying mode of the present invention. As indicated in FIG. 11, during operation of fans F1 having been installed inside the protective suit in the ventilating/exhausting fan mounts, through the air feed/exhaust parts 1 air enters into the interior and exits to exterior of the protective suit P1. By employing fans F1 as described above, the protective suit neither over-shrinks nor over-inflates, enabling jobs to be completed comfortably. At the same time, thanks to the interior of the protective suit not being liable to grow hot and humid, preventing heatstroke effectively is made possible.

Figure 12A:
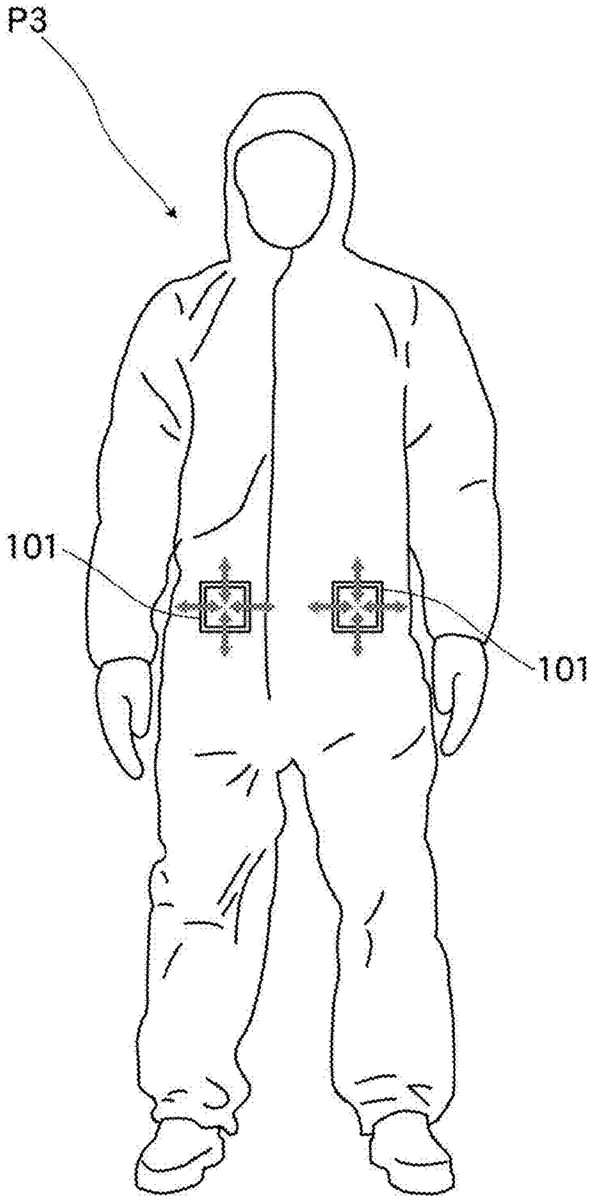
FIG. 12A is a schematized front-side diagram, and FIG. 12B a schematized back-side diagram, representing flows of air when ventilating/exhausting fans have been installed and are being operated in the asbestos-removal protective work suit with ventilating/exhausting fan mounts involving a third embodying mode of the present invention.
Figure 12B:
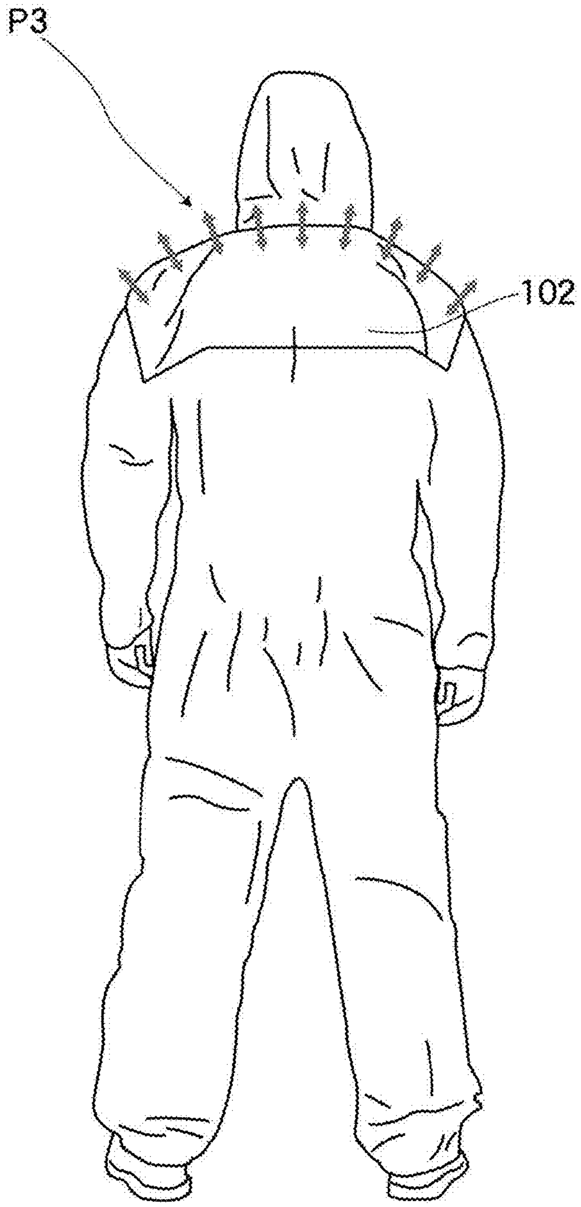

FIG. 12A is a schematized front-side diagram, and FIG. 12B a schematized back-side diagram, representing flows of air when fans have been installed and are being operated in the protective suit involving the third embodying mode of the present invention. As indicated in FIG. 12A, when fans F1 have been installed inside the fan mounts and are in operation, air enters through the air feed/exhaust parts 101 into the interior and exits to the exterior of the protective suit P3. Meanwhile, in this case, as indicated in FIG. 12B, through the air exit/entry part 102 air in the opposite direction enters into the interior and exits to exterior of the protective suit P3.

It should be noted that, although not depicted in the figures, a power-supply mount for mounting a battery or other power supply unit that runs fans F1 is, preferably—to optimize job continuity and increase ease of putting on and taking off the protective suit-provided inside the protective suit.

Figure 13:
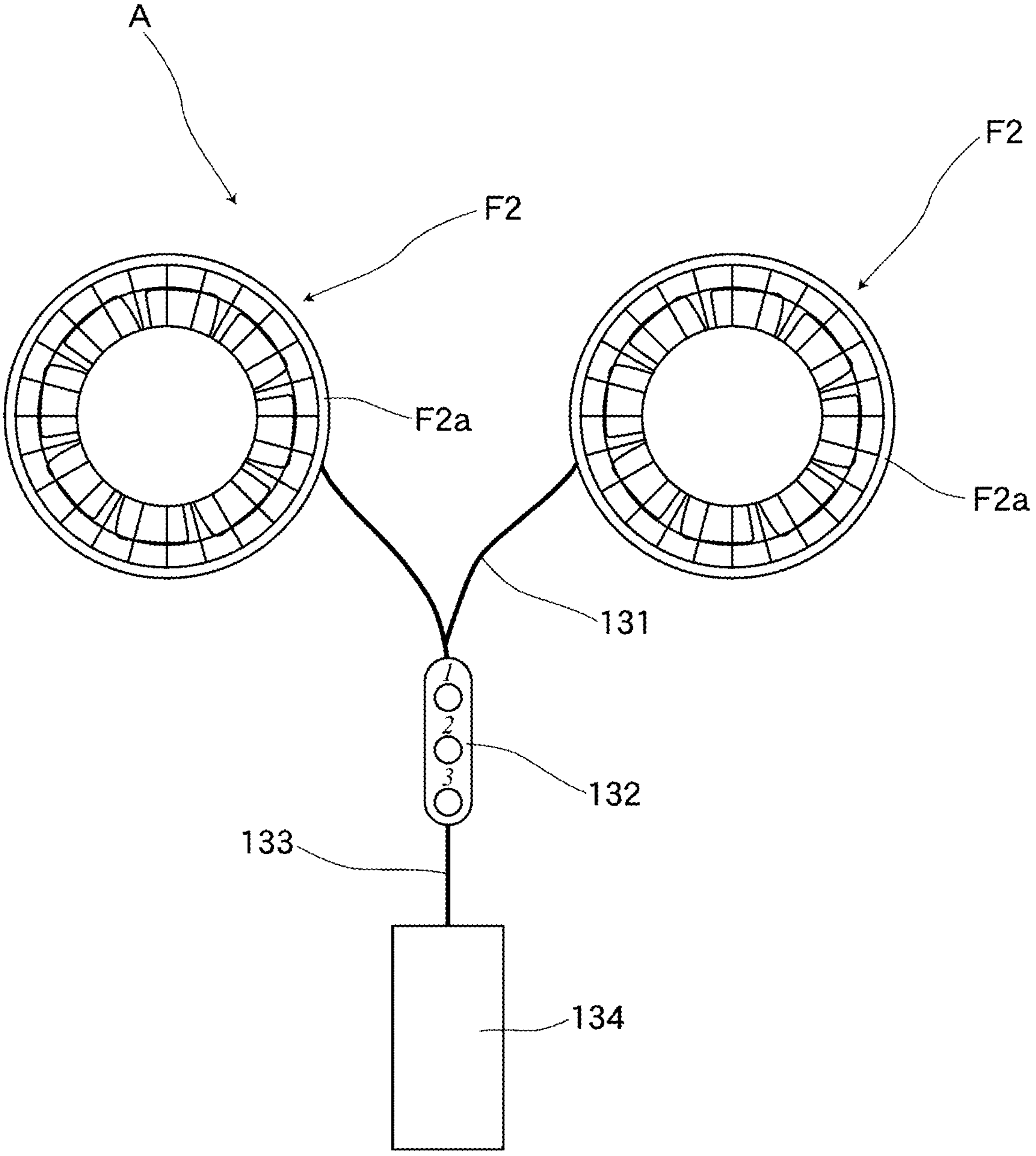
FIG. 13 is a schematized diagram representing a single example of a ventilating/exhausting apparatus utilized in an asbestos-removal protective work suit with ventilating/exhausting fan mounts of the present invention.

FIG. 13 is a schematized diagram representing a single example of a ventilating/exhausting apparatus utilized in the protective suit of the present invention. As depicted in FIG. 13, a ventilating/exhausting apparatus A is furnished with fans F2, first connecting elements 131, an operational control unit 132, a second connecting element 133, and a power supply unit 134. In implementations in which the apparatus has been installed in the protective suit P1 to P4, the two fans F2 are connected to the operational control unit 132 by means of the first connecting elements 131. Likewise, the operational control unit 132 is connected to the power supply unit 134 by means of the second connecting element 133.

The first connecting elements 131 and the second connecting element 133 are for supplying power from the power supply unit 134 to the ventilating/exhausting fans F2. Also, while a battery or the like may be given as an implementation of the power supply unit 134, a power supply component other than the power supply unit 134 may be used additionally.

The operational control unit 132 is a device that for example enables the ventilating/exhausting fans F2 to be switched among modes including ventilating mode, exhausting mode, and ventilating/exhausting alternation mode. As indicated in FIG. 13, one conceivable example is to render the control unit with buttons in which button 1 is for putting the fans into ventilating mode, button 2 for putting them into exhausting mode, and button 3 for putting them into ventilating/exhausting alternation mode. Furthermore, the operational control unit 132 may be made detachable, thus allowing wireless control of the ventilating/exhausting fans F2 and the power supply unit 134. Wireless communication methods may include, but are not limited to, Bluetooth®.

EMBODIMENT EXAMPLES

In the following, realistic implementation examples will be given to describe the present invention, but the present invention is not limited by these examples.

Filter-Component Laminate Intermediate

The filter component laminate intermediate contains polyacrylonitrile fibers and polyolefin fibers; filter components or nonwoven fabrics in which polyacrylonitrile fibers and polyolefin fibers are mixed have been known to date. For example, Japanese Unexamined Pat. App. Pub. No. H7-256024 presents an air filter material having an electrostatic effect that is manufactured by a technique in which for the effect, a mixture of these fibers is subjected to needling and activated by heat. Also, in Japanese Unexamined Pat. App. Pub. No. 2000-189732, needle-punching is carried out on polyolefin fibers and acrylic fibers to prepare, as a prefilter, a triboelectric nonwoven fabric. Still further, in Japanese Unexamined Pat. App. Pub. No. 2002-249963, an electrically charged nonwoven fabric in which a phosphorus-based additive and a sulfur-based additive are incorporated into polyolefin-based fibers is disclosed.

Embodiment Example

As the filter component, polypropylene fibers and polyacrylonitrile fibers were first mixed together based on the embodiment example set forth in Japanese Unexamined Pat. App. Pub. No. 2002-249963, and by a needle-punching technique a nonwoven fabric of 80 $g/m^2$ grammage was created. With this nonwoven fabric as a laminate intermediate, it was stacked together with, as an outer layer, a polypropylene spunbond nonwoven fabric of 25 $g/m^2$ grammage and, as an inner layer, a polypropylene spunbond nonwoven fabric of 20 $g/m^2$ grammage. As indicated in FIG. 6, the filter component used in the present invention was then fabricated by ultrasonic welding.

Wet-Bulb Globe Temperature (WBGT) Test on Asbestos-Removal Protective Work Suit while Being Worn As set forth in the Japanese Society of Biometeorology's "Preventing Heatstroke in Everyday Life," $3^{rd}$ Edition, 2023 (<https://seikishou.jp/cms/wp-content/uploads/008ab7fdbb0b958314827de9a7b8c74c.pdf>), wet-bulb globe temperature (WBGT) is exploited as an index for heatstroke prevention. With this indicator, according to the WBGT value the degree of heatstroke risk is represented in four levels: "danger," "severe warning," "warning," and "caution." In concrete terms, the judgment can be made utilizing the WBGT Simplified Estimation Chart Ver. 4, for indoor use. With this test, the degree of heatstroke risk was checked employing protective suit P1 in which a filter component utilized in the present invention had been installed.

Measurement Conditions

Indoor temperature: 27.5° C., humidity: 65%

Wearer: Male in his 40s

To begin with, after protective suit P1 was put on, when 9 minutes had elapsed with the ventilating/exhausting fans in the OFF state, the interior of the trunk section was gauged, whereupon the temperature was 31.5° C. and the humidity was 73%.

After that, the ventilating/exhausting fans were turned on, and when measurements were taken while the fans were being switched every minute between ventilating air and exhausting air, after 5 minutes, the temperature was 31.5° C. and the humidity was 51%.

When these measurements were set against the indoor WBGT Simplified Estimation Chart Ver. 4, while on the one hand the as-is measurements were in "severe warning," with the embodiment example, the measurements bettered from "severe warning" to "warning." Therefore, it will be appreciated that protective suit P1 involving the present invention is extraordinarily effective in preventing workers' heatstroke.

Furthermore, during the measurements, it was found that protective suit P1 neither excessively inflated nor shrank, indicating that protective suit P1 does not cause any hindrance to work.

Modes of embodying the present invention, then, include the following configurations.

Configuration 1

An asbestos-removal protective work suit with ventilating/exhausting fan mounts, comprising air feed/exhaust sections furnished on either side of a front-side trunk section, and ventilating/exhausting fan mounts, furnished on a protective-suit inner side of the air feed/exhaust sections, that detachably/reattachably mount ventilating/exhausting fans; the asbestos-removal protective work suit with ventilating/exhausting fan mounts:

- being wherein the air feed/exhaust sections comprise a filter component having a laminate intermediate of 150 to 250 $g/m^2$ grammage containing polyacrylonitrile fibers and polyolefin fibers, and an outer-side layer and an inner-side layer of 15 to 35 $g/m^2$ grammage containing polypropylene fibers; and
- therein, except for the air feed/exhaust sections and the ventilating/exhausting fan mounts, comprising fabric material having a plastic film layer.

Configuration 2

An asbestos-removal protective work suit with ventilating/exhausting fan mounts, comprising air feed/exhaust sections furnished on either of left/right sides of a back-side trunk section, and ventilating/exhausting fan mounts, furnished on a protective-suit inner side of the air feed/exhaust sections, that detachably/reattachably mount ventilating/exhausting fans; the asbestos-removal protective work suit with ventilating/exhausting fan mounts:

- being wherein the air feed/exhaust sections comprise a filter component having a laminate intermediate of 150 to 250 $g/m^2$ grammage containing polyacrylonitrile fibers and polyolefin fibers, and an outer-side layer and an inner-side layer of 15 to 35 $g/m^2$ grammage containing polypropylene fibers; and therein, except for the air feed/exhaust sections and the ventilating/exhausting fan mounts, comprising fabric material having a plastic film layer.

Configuration 3

The asbestos-removal protective work suit with ventilating/exhausting fan mounts set forth in Configuration 1, further comprising an air exit/entry section in the back-side trunk section, provided upward from the air feed/exhaust sections.

Configuration 4

The asbestos-removal protective work suit with ventilating/exhausting fan mounts set forth in Configuration 2, further comprising an air exit/entry section in the front-side trunk section, provided upward from the air feed/exhaust sections.

Configuration 5

The asbestos-removal protective work suit with ventilating/exhausting fan mounts set forth in any one of Configurations 1 through 4, wherein the laminate intermediate, the outer layer, and the inner layer are bonded together by ultrasonic welding.

Configuration 6

The asbestos-removal protective work suit with ventilating/exhausting fan mounts set forth in any one of Configurations 1 through 4, wherein the air exit/entry section is a spun-melt-spun (SMS) nonwoven fabric or is the filter component.

Configuration 7

The asbestos-removal protective work suit with ventilating/exhausting fan mounts set forth in Configuration 5, wherein the air exit/entry section is an SMS nonwoven fabric or is the filter component.

Configuration 8

The asbestos-removal protective work suit with ventilating/exhausting fan mounts set forth in any one of Configurations 1 through 4, wherein the ventilating/exhausting fan mounts include a synthetic resin component having an opening for mounting a ventilating/exhausting fan, and an outer frame to which the synthetic resin component is attached, being wherein the opening comprises an approximately U-shaped ventilating/exhausting-fan first interlocking section, a ventilating/exhausting-fan second interlocking section above the ventilating/exhausting-fan first interlocking section, and notches provided between the ventilating/exhausting-fan first interlocking section and the ventilating/exhausting-fan second interlocking section. The slot may be created from a single piece of material, with notches cut into the inner side of the top two corners, creating a U-shaped slot and a top flap that secures the fan in place.

Configuration 9

The asbestos-removal protective work suit with ventilating/exhausting fan mounts set forth in Configuration 5, wherein the ventilating/exhausting fan mounts include a synthetic resin component having an opening for mounting a ventilating/exhausting fan, and an outer frame to which the synthetic resin component is attached, being wherein the opening comprises an approximately U-shaped ventilating/exhausting-fan first interlocking section, a ventilating/exhausting-fan second interlocking section above the ventilating/exhausting-fan first interlocking section, and notches provided between the ventilating/exhausting-fan first interlocking section and the ventilating/exhausting-fan second interlocking section. The slot may be created from a single piece of material, with notches cut into the inner side of the top two corners, creating a U-shaped slot and a top flap that secures the fan in place.

Configuration 10

The asbestos-removal protective work suit with ventilating/exhausting fan mounts set forth in Configuration 6, wherein the ventilating/exhausting fan mounts include a synthetic resin component having an opening for mounting a ventilating/exhausting fan, and an outer frame to which the synthetic resin component is attached, being wherein the opening comprises an approximately U-shaped ventilating/exhausting-fan first interlocking section, a ventilating/exhausting-fan second interlocking section above the ventilating/exhausting-fan first interlocking section, and notches provided between the ventilating/exhausting-fan first interlocking section and the ventilating/exhausting-fan second interlocking section. The slot may be created from a single piece of material, with notches cut into the inner side of the top two corners, creating a U-shaped slot and a top flap that secures the fan in place.

Configuration 11

The asbestos-removal protective work suit with ventilating/exhausting fan mounts set forth in Configuration 7, wherein the ventilating/exhausting fan mounts include a synthetic resin component having an opening for mounting a ventilating/exhausting fan, and an outer frame to which the synthetic resin component is attached, being wherein the opening comprises an approximately U-shaped ventilating/exhausting-fan first interlocking section, a ventilating/exhausting-fan second interlocking section above the ventilating/exhausting-fan first interlocking section, and notches provided between the ventilating/exhausting-fan first interlocking section and the ventilating/exhausting-fan second interlocking section. The slot may be created from a single piece of material, with notches cut into the inner side of the top two corners, creating a U-shaped slot and a top flap that secures the fan in place.

Configuration 12

An asbestos-removal protective work suit with ventilating/exhausting fans in which onto the ventilating/exhausting fan mounts of an asbestos-removal protective work suit with ventilating/exhausting fan mounts set forth in Configuration 9, ventilating/exhausting fans are attached.

Configuration 13

An asbestos-removal protective work suit with ventilating/exhausting fans in which onto the ventilating/exhausting fan mounts of an asbestos-removal protective work suit with ventilating/exhausting fan mounts set forth in Configuration 10, ventilating/exhausting fans are attached.

Configuration 14

An asbestos-removal protective work suit with ventilating/exhausting fans in which onto the ventilating/exhausting fan mounts of an asbestos-removal protective work suit with ventilating/exhausting fan mounts set forth in Configuration 11, ventilating/exhausting fans are attached.

Configuration 15

The asbestos-removal protective work suit with ventilating/exhausting fans set forth in Configuration 12, wherein by means of a ventilating/exhausting apparatus containing an operational control unit, the ventilating/exhausting fans repeat ventilating air and exhausting air in alternation.

Configuration 16

The asbestos-removal protective work suit with ventilating/exhausting fans set forth in Configuration 13, wherein by means of a ventilating/exhausting apparatus containing an operational control unit, the ventilating/exhausting fans repeat ventilating air and exhausting air in alternation.

Configuration 17

The asbestos-removal protective work suit with ventilating/exhausting fans set forth in Configuration 14, wherein by means of a ventilating/exhausting apparatus containing an operational control unit, the ventilating/exhausting fans repeat ventilating air and exhausting air in alternation.

The embodying modes disclosed on this occasion should be considered in all respects illustrative and not limiting. The scope of the present invention is indicated by the scope of the patent claims, not the above-stated description; it is intended that all modifications within meanings and scope equivalent to the scope of the patent claims are included.

DESCRIPTION OF REFERENCE MARKS

1, 11, 101, 111: air feed/exhaust sections
102, 112: air exit/entry section
5: filter component
6: ventilation section
20: ventilating/exhausting fan mount
21: outer frame
22: synthetic resin component
23: opening
24: first interlocking section
25: second interlocking section
26: notch
27*a*: protrusion
27*b*: bend line
131: first connecting element
132: operational control unit
133: second connecting element
134: power supply unit
A: ventilating/exhausting apparatus
F1: ventilating/exhausting fan
F1*a*: flange
L1: outer-side layer
L2: laminate intermediate
L3: inner-side layer
P1, P2, P3, P4: ventilating/exhausting fan-mount equipped asbestos-removal protective work suit

What is claimed is:

1. An asbestos-removal protective work suit comprising
an air feed-and-exhaust section furnished on each of left and right sides of a front-side trunk section, the air feed-and exhaust sections each comprising a filter component having a laminate intermediate of 150 to 250 g/m$^2$ grammage containing polyacrylonitrile fibers and polyolefin fibers, and an outer-side layer and an inner-side layer of 15 to 35 g/m$^2$ grammage containing polypropylene fibers; and
ventilating-and-exhausting fan mounts, furnished on a protective-suit inner side of the air feed-and exhaust sections, that detachably/reattachably mount ventilating/exhausting fans, the ventilating-and-exhausting fan mounts each including a synthetic resin component having an opening for mounting a ventilating/exhausting fan, and an outer frame to which the synthetic resin component is attached; wherein
the asbestos-removal protective work suit, except for the air feed-and-exhaust sections and the ventilating-and-exhausting fan mounts, comprises fabric material having a plastic film layer; and
the opening comprises an approximately U-shaped ventilating/exhausting-fan first interlocking section, a ventilating/exhausting-fan second interlocking section above the ventilating/exhausting-fan first interlocking section, and notches provided between the ventilating/exhausting-fan first interlocking section and the ventilating/exhausting-fan second interlocking section.

2. An asbestos-removal protective work suit, comprising
an air feed-and-exhaust section furnished on each of left and right sides of a back-side trunk section, the air feed-and-exhaust sections each comprising a filter component having a laminate intermediate of 150 to 250 g/m$^2$ grammage containing polyacrylonitrile fibers, and polyolefin fibers, and an outer-side layer and an inner-side layer of 15 to 35 g/m$^2$ grammage containing polypropylene fibers; and
ventilating-and-exhausting fan mounts, furnished on a protective-suit inner side of the air feed-and-exhaust sections, that detachably/reattachably mount ventilating/exhausting fans, the ventilating-and-exhausting fan mounts each including a synthetic resin component having and opening for mounting a ventilating/exhausting fan, and an outer frame to which the synthetic resin component is attached; wherein
the asbestos-removal protective work suit, except for the air feed-and-exhaust sections and the ventilating-and-exhausting fan mounts, comprises fabric material having a plastic film layer; and
the opening comprises an approximately U-shaped ventilating/exhausting-fan first interlocking section, a ventilating/exhausting-fan second interlocking section above the ventilating/exhausting-fan first interlocking section, and notches provided between the ventilating/exhausting-fan first interlocking section and the ventilating/exhausting-fan second interlocking section.

3. The asbestos-removal protective work suit set forth in claim 1, further comprising an air exit-and-entry section, being a back-side trunk section, provided upward from the air feed-and-exhaust sections.

4. The asbestos-removal protective work suit set forth in claim 2, further comprising an air exit-and-entry section, being a front-side trunk section, provided upward from the air feed-and-exhaust sections.

5. The asbestos-removal protective work suit set forth in any one of claims 1 through 4, wherein the laminate intermediate, the outer-side layer, and the inner-side layer are bonded together by ultrasonic welding.

6. The asbestos-removal protective work suit set forth in claim 3 or 4, wherein the air exit-and-entry section is a spun-melt-spun nonwoven fabric or is the filter component.

7. The asbestos-removal protective work suit set forth in any one of claims 1 through 4, in which onto the ventilating-and-exhausting fan mounts ventilating/exhausting fans are attached.

8. The asbestos-removal protective work suit set forth in claim 5, in which onto the ventilating-and-exhausting fan mounts ventilating/exhausting fans are attached.

9. The asbestos-removal protective work suit set forth in claim 6, in which onto the ventilating-and-exhausting fan mounts ventilating/exhausting fans are attached.

10. The asbestos-removal protective work suit set forth in claim 7, wherein by means of a ventilating/exhausting apparatus containing an operational control unit, the ventilating/exhausting fans repeat ventilating air and exhausting air in alternation.

11. The asbestos-removal protective work suit set forth in claim 8, wherein by means of a ventilating/exhausting apparatus containing an operational control unit, the ventilating/exhausting fans repeat ventilating air and exhausting air in alternation.

12. The asbestos-removal protective work suit set forth in claim 9, wherein by means of a ventilating/exhausting apparatus containing an operational control unit, the ventilating/exhausting fans repeat ventilating air and exhausting air in alternation.

* * * * *